United States Patent
Hsu

[19]

[11] Patent Number: 5,853,599
[45] Date of Patent: *Dec. 29, 1998

[54] MONITORING PROCESS FOR A REVERSE OSMOSIS PURIFICATION SYSTEM OF DRINKING WATER

[76] Inventor: Chao Fou Hsu, 109, Lane 316, Dah Shuenn 3th Rd., Kaohsiung, Taiwan

[*] Notice: The term of this patent shall not extend beyond the expiration date of Pat. No. 5,499,197.

[21] Appl. No.: 613,377

[22] Filed: Mar. 11, 1996

[51] Int. Cl.⁶ .......................... B01D 61/12; B01D 17/12
[52] U.S. Cl. .......................... 210/739; 210/93; 210/100; 210/652
[58] Field of Search .................. 210/85, 87, 90, 210/93, 96.1, 96.2, 100, 103, 108, 138, 143, 257.2, 258, 259, 321.69, 416.3, 636, 652, 739, 741, 746, 806, 195.2; 364/479.01, 479.1, 479.14, 496, 497, 499–502, 509, 510, 550; 340/603, 606, 609

[56] References Cited

U.S. PATENT DOCUMENTS

| | | | |
|---|---|---|---|
| 3,856,676 | 12/1974 | Grimme et al. | 210/96.2 |
| 4,801,375 | 1/1989 | Padilla | 210/100 |
| 4,918,426 | 4/1990 | Butts et al. | 210/89 |
| 4,969,991 | 11/1990 | Valadez | 210/195.2 |
| 5,096,574 | 3/1992 | Birdsong et al. | 210/90 |
| 5,450,358 | 9/1995 | Seibert et al. | 364/497 |
| 5,494,573 | 2/1996 | Schoenmeyr et al. | 210/258 |
| 5,499,197 | 3/1996 | Fou | 210/143 |
| 5,676,824 | 10/1997 | Jeon et al. | 210/87 |

*Primary Examiner*—Joseph W. Drodge
*Attorney, Agent, or Firm*—David & Raymond; Raymond Y. Chan

[57] ABSTRACT

A monitoring device for a reverse osmosis purification system of drinking water comprising a microprocessor that controls the overall operations of the monitoring system, a LCD indicating circuit that relates information to maintenance personnel, a detecting means that analyses related data for determining the condition and extents of clogging of the reverse osmosis filtration elements, a warning means that produces verbal or musical sound for warning consumers about the clogged condition of the reverse osmosis filtration elements, and a power switching means that cuts off electricity supply to the water pump of the purification system. In operation, the reverse osmosis filtration elements will be clogged by impurities after being used for a period of time. If the reverse osmosis filtration elements are clogged, the monitoring device will make a sound to warn of such condition of the reverse osmosis filtration elements and will eventually cut off the power supply to the pump for stopping water delivery if the clogged reverse osmosis filtration elements are not replaced after a certain period of time.

1 Claim, 5 Drawing Sheets

MONITORING PROCESS FOR A REVERSE OSMOSIS PURIFICATION SYSTEM OF DRINKING WATER

BACKGROUND OF THE PRESENT INVENTION

The present invention relates generally to a reverse osmosis purification system for producing drinking water, and more particularly to a monitoring process and device for a reverse osmosis purification system for producing drinking water for monitoring the system to make purified drinking water having a purity quality in conformity with the standards of public health. The present invention provides a function of notifying of the exact timing of replacing of the purifying elements or backwashing reverse osmosis membranes included in the purification system to ensure their effectiveness.

The main culprits of the water pollution today include industrial wastes, household wastes, farm pesticides, and the animal wastes produced by hog and poultry farms. As the pollution problems of sources of our drinking water, such as the rivers, have become increasingly worrisome, people tend to have very little confidence in the quality of their drinking water provided by the water company. Furthermore, people's anxiety over the quality of their drinking water is further aggravated by the fact that the conditions of the water-supplying pipes and reservoirs are often found to be unsatisfactory. As a result, a variety of water-treating devices, such as water-filtering devices, water purifying devices, water softening devices, etc., have become ubiquitous in places like offices, homes, factories, schools, churches, and so forth. In general, such conventional water-treating devices as mentioned above are provided with one or more additional filtration means for enhancing the purity of the drinking water. The conventional reverse osmosis purification systems of drinking water are, in fact, effective in upgrading the quality of the drinking water. Nevertheless, the conventional reverse osmosis purification systems of drinking water are defective in design. The shortcomings inherent in the conventional drinking machines are described explicitly hereinafter.

Reverse osmosis filtration elements are supposed to be replaced or backwashed after a predetermined period of operating time without one knowing the actual conditions of the reverse osmosis filtration elements. In many cases, overused reverse osmosis filtration elements are not replaced or backwashed in time and consumers are unknowingly led to drink the poor quality water from such ineffective water purification systems.

Nowadays, the most popular and effective drinking water purifying element is the reverse osmosis membrane which is so arranged as to form a parallel tangent plane with the flowing direction of the water. The water is forced under pressure against the reverse osmosis filtration element by means of a manually operation switch valve to increase the speed and the flow of the water passing through the reverse osmosis filtration element. Some of the water can be caused to pass through the reverse osmosis filtration element in a vertical angle instead of a parallel manner in order to filter out salts and other micro-impurities.

Figure 1:
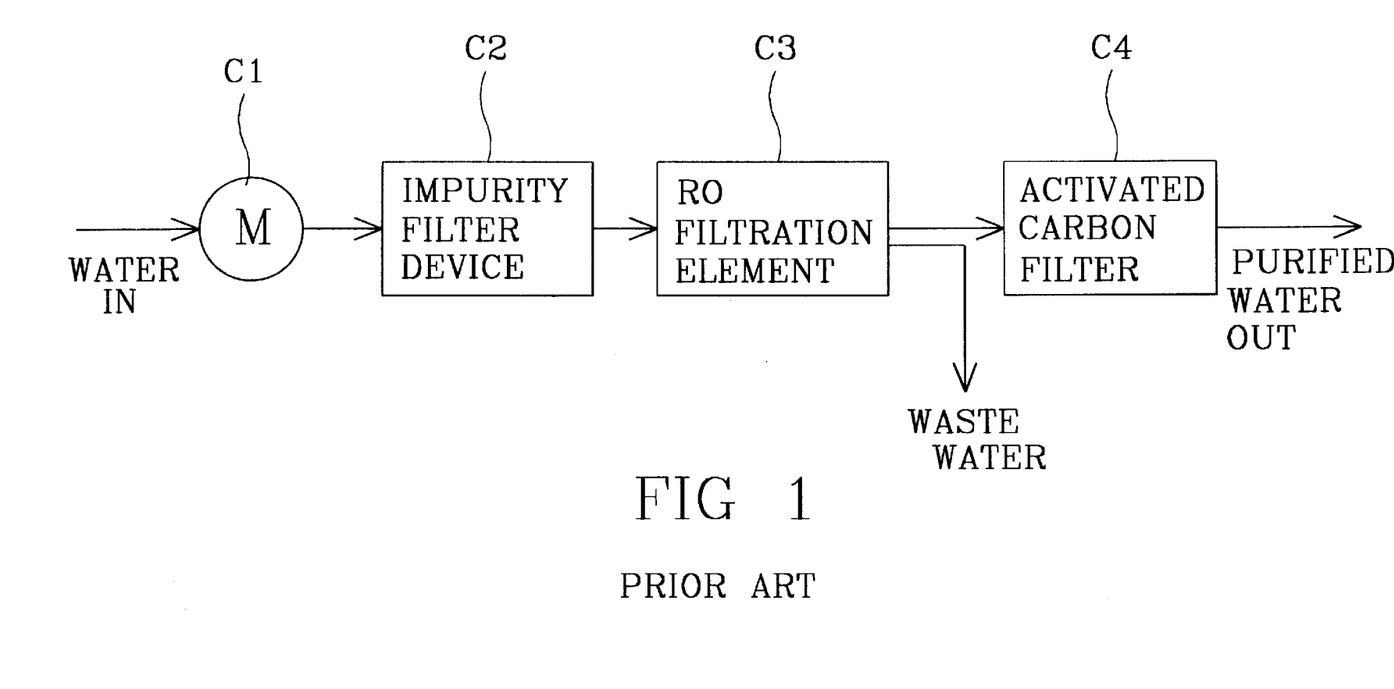
FIG. 1 is a block diagram of a reverse osmosis purification system of drinking water having an impurity filter device, a reverse osmosis filtration element and an activated carbon filter according to the present invention.

Referring to FIG. 1, the most common reverse osmosis purification system for producing drinking water is illustrated, which comprises a water pressure pump C1, an impurity filter device C2, a reverse osmosis filtration element C3, and an activated carbon filter C4. The impurity filter device C2 is used to pre-purify the water from tap water or other water sources before feeding it to the reverse osmosis filtration element C3 in order to prolong the service life span of the relatively expensive reverse osmosis filtration element C3. The best number and style of impurity filter devices C2 needed to be installed depends on the water quality and the amount of suspended impurities and organic particles in the source water. The activated carbon filter C4 can be installed before or after the reverse osmosis filtration element C3 for removing any poison contents in water.

Since the mesh of the reverse osmosis membrane of the reverse osmosis filtration element C3 is very tiny, the diameter of each reverse osmosis membrane mesh is very small, ex. 0.00000001 cm. The water pressure pump C1 is used to provide pressurized water with 80 psi to 100 psi in order to penetrate the reverse osmosis membrane. When the pre-purified water from the impurity filter device C2 is pumped through the reverse osmosis filtration element C3, the reverse osmosis membrane can isolate clean water molecules to obtain purified drinking water, wherein the high concentrated waste water is drained off or collected for other cleaning purpose.

However, the reverse osmosis filtration element must be backwashed and cleaned periodically according to the schedule specified by the manufacturer. In order to prolong the service life span of the reverse osmosis filtration element, the impurities deposited in the reverse osmosis filtration element must be removed so as to prevent them from becoming hardened and clogging the reverse osmosis filtration element. It happens from time to time that the cleaning schedule of the reverse osmosis filtration element of the reverse osmosis purification system is unintentionally disregarded or overlooked. Furthermore, the chore of cleaning the reverse osmosis filtration element is not a task that people enjoy to do. It is an irresistible trend of the modern age that the consumers prefer an automated appliance rather than a manually operated appliance.

The reverse osmosis filtration element of the reverse osmosis purification system of drinking water mentioned above is capable of filtering out the impurities, such as unwanted suspended particles, chlorine molecules, pesticides, various organic matters, heavy metals, and organic compounds such as chloroform, which is a carcinogen. In addition, the reverse osmosis filtration element is capable of deodorizing the water. If such impurities as mentioned above are allowed to accumulate in the reverse osmosis filtration element, its filtering effect will be seriously undetermined to an extent that bacteria and fungi can grow and flourish on the accumulated impurities, thereby a potential health hazard is brought about to the users of the reverse osmosis purification system.

Moreover, if the reverse osmosis purification system of drinking water is used less often, the service life span of the reverse osmosis membrane is prolonged accordingly. Therefore, the scheduled maintenance work of the reverse osmosis purification system is likely to be delayed or even skipped. The quality of operating performance of the reverse osmosis purification system is often compromised by the lack of routine maintenance work for the reverse osmosis purification system.

In fact, no matter what kind of the reverse osmosis purification system you have installed, none of the reverse osmosis purification systems are provided with a warning system, which serves to keep the users of the system to be on the alert, for any indication that the reverse osmosis purification system of drinking water is no longer working properly so the drinking water so made is absolutely safe to drink.

SUMMARY OF THE PRESENT INVENTION

The primary object of the present invention is to provide a monitoring process for a reverse osmosis purification system for drinking water for monitoring the effectiveness of the reverse osmosis purification system of drinking water and warning of any ineffective condition, wherein if such ineffective condition persists, it can stop the water from coming out of the reverse osmosis purification system to protect the unaware consumers.

Another object of the present invention is to provide a monitoring process for a reverse osmosis purification system of drinking water which comprises a step of automatically ceasing supply of the drinking water and providing for reverse flowing of water to backwash and clean periodically the impurities deposited in the reverse osmosis filtration element of the reverse osmosis purification system.

It is still another object of the present invention to provide a monitoring device for a reverse osmosis purification system for drinking water, capable of monitoring automatically the quality of the drinking water made by the reverse osmosis purification system, advancing information signals when the output water quality is under a predetermined standard so as to warn of the timing of replacing the disabling filtration element and ceasing the water supply of the reverse osmosis purification system once the discharged drinking water is under a predetermined standard condition to ensure that the drinking water has the highest quality.

It is still another object of the present invention to provide a monitoring device for a reverse osmosis purification system for drinking water having a reverse osmosis filtration element, capable of automatically ceasing the supply of drinking water from the reverse osmosis purification system when the PPM (parts per million) value of the drinking water and the service life of the reverse osmosis membranes are not in conformity with the corresponding specified safety standards, so as to ensure that the reverse osmosis purification system can provide drinking water of highest quality.

DETAILED DESCRIPTION OF THE PREFERRED EMBODIMENT

The present invention provides a monitoring process and device for a reverse osmosis purification system of drinking water having at least a reverse osmosis filtration element.

As shown in FIG. 1 a most common and effective reverse osmosis purification system of drinking water is illustrated, which comprises a water pressure pump C1, an impurity filter device C2, a reverse osmosis filtration element C3, and an activated carbon filter C4.

The pre-purified water coming out from the impurity filter device C2 is fed to the reverse osmosis filtration element C3. Since the mesh of the reverse osmosis membrane of the reverse osmosis filtration element C3 is very tiny, the diameter of the mesh of the reverse osmosis membrane is very small, ex. 0.00000001 cm. The water pressure pump C1 provides compressed water with 80 psi to 100 psi in order to penetrate through the reverse osmosis membrane. The reverse osmosis membrane can isolate clean water molecules to obtain purified drinking water and highly concentrated waste water which is discharged for disposal or secondary use such as floor washing and toilet flushing.

Figure 2:
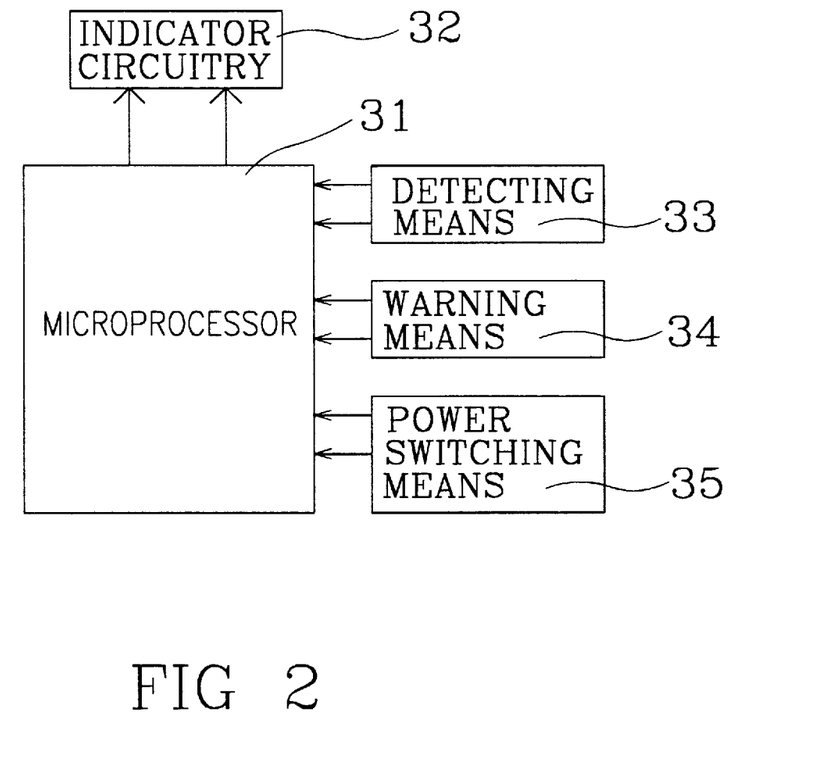
FIG. 2 is a flow chart of a monitoring device for a reverse osmosis purification system of drinking water of the present invention.

Referring to FIG. 2, it is a block diagram of the monitoring device of the present invention. The monitoring device of the present invention comprises a microprocessor 31, an LCD indicator circuitry 32 electrically connected to the microprocessor 31, a detecting means 33 electrically connected to the microprocessor 31, a warning means 34 electrically connected to the microprocessor 31, and a power switching means 35 electrically connected to the water pressure pump C1 and the microprocessor 31.

Operational signals are sent from the detecting means 33 regarding the functional integrity of the reverse osmosis filtration element by a sensor detecting the quality of the drinking water so made which are sent to the microprocessor 31. When the microprocessor 31 receives such signals from the detecting means 33, the microprocessor 31 will process a respective response by sending corresponding signals to the warning means 34 and the power switching means 35 for activating them to process predetermined functions, respectively.

The microprocessor 31 provides a central control of the operations of the monitoring device and shares a power source with the reverse osmosis purification system for drinking water. The specific service life data of the reverse osmosis filtration elements of the reverse osmosis purification system are formatted and input into the microprocessor as digital predetermined reference value. A preferred embodiment of the present invention uses a monolithic chip microprocessor 31 such as a model number 8051 or 8052 to provide I/O memory. A plurality of programs stored in the microprocessor 31 control the entire operation of the monitoring device.

The LCD indicator circuitry 32 is electrically connected to the microprocessor 31 for notifying the maintenance personnel of the time of replacing the reverse osmosis filtration element and indicating related information from the microprocessor 31, such as the data of current time, the time when the replacement of each filtration element taken place, the PPM value of the drinking water made, the current value of water making volume, the total value of water making volume, the mechanical breakdown condition, etc. which is all stored in the microprocessor 31.

The detecting means 33 comprises at least a reverse osmosis detecting circuitry electrically connected to the microprocessor 31 for monitoring the functional integrity of each filtration element by detecting the quality of the drinking water made by the reverse osmosis filtration element. The detecting means 33 comprises at least a detector for determining the condition of the reverse osmosis filtration element. The detecting means 33 reads and analyses detected signals from the detector and generates a related condition detecting value. When the condition detecting value reaches a certain predetermined reference value preset in the microprocessor, the detecting means will send a digital signal and transmit such digital signal to the microprocessor.

The warning means 34 is electrically connected to the microprocessor 31 for advancing a warning information sound signal to remind a user of the exact time of replacing a specific filtration element. The warning means 34 is activated by the microprocessor 31 of the monitoring device by sending an activating signal thereto when the condition detecting value approximating the predetermined reference value is detected, in which such predetermined reference value indicates that the service life of the specific filtration element is completed.

The power switching means 35 is electrically connected to the microprocessor 31 and activated by the microprocessor 31 for ceasing the supply of drinking water from the whole reverse osmosis purification system of drinking water when the warning means 34 is activated to generate a warning signal for a predetermined period of time. It means that the specific reverse osmosis filtration element of the reverse osmosis purification system has become ineffective and the drinking water so made is not safe for human consumption.

When the specific worn-out filtration element is replaced by a new one, the maintenance personnel may manually reactivate the monitoring device to produce drinking water again and stop the warning means 32 from providing the warning information signal.

Figure 3:
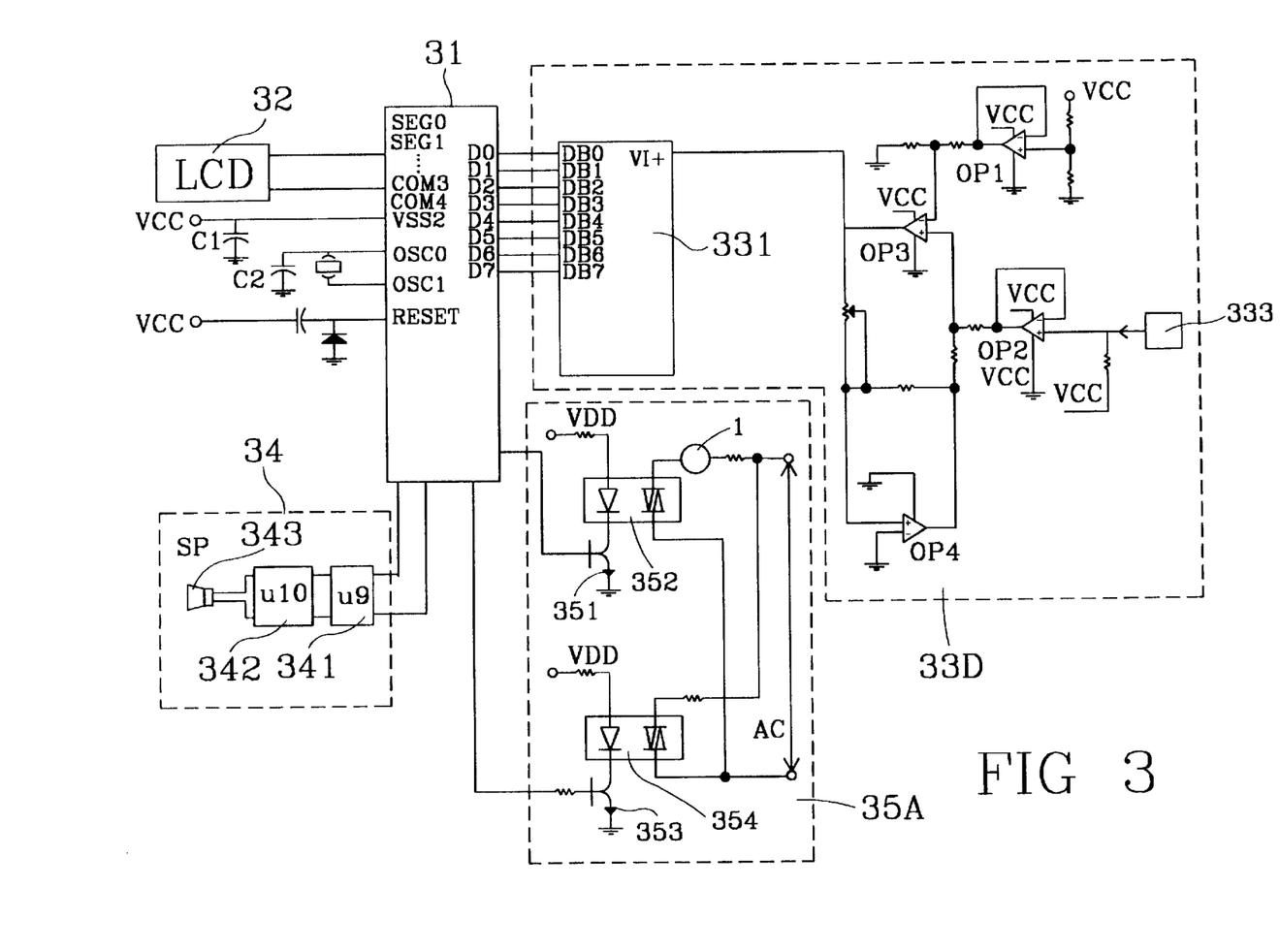
FIG. 3 is a circuit diagram of the monitoring device for a reverse osmosis purification system of drinking water having at least a reverse osmosis filtration element according to the present invention.
Figure 4:
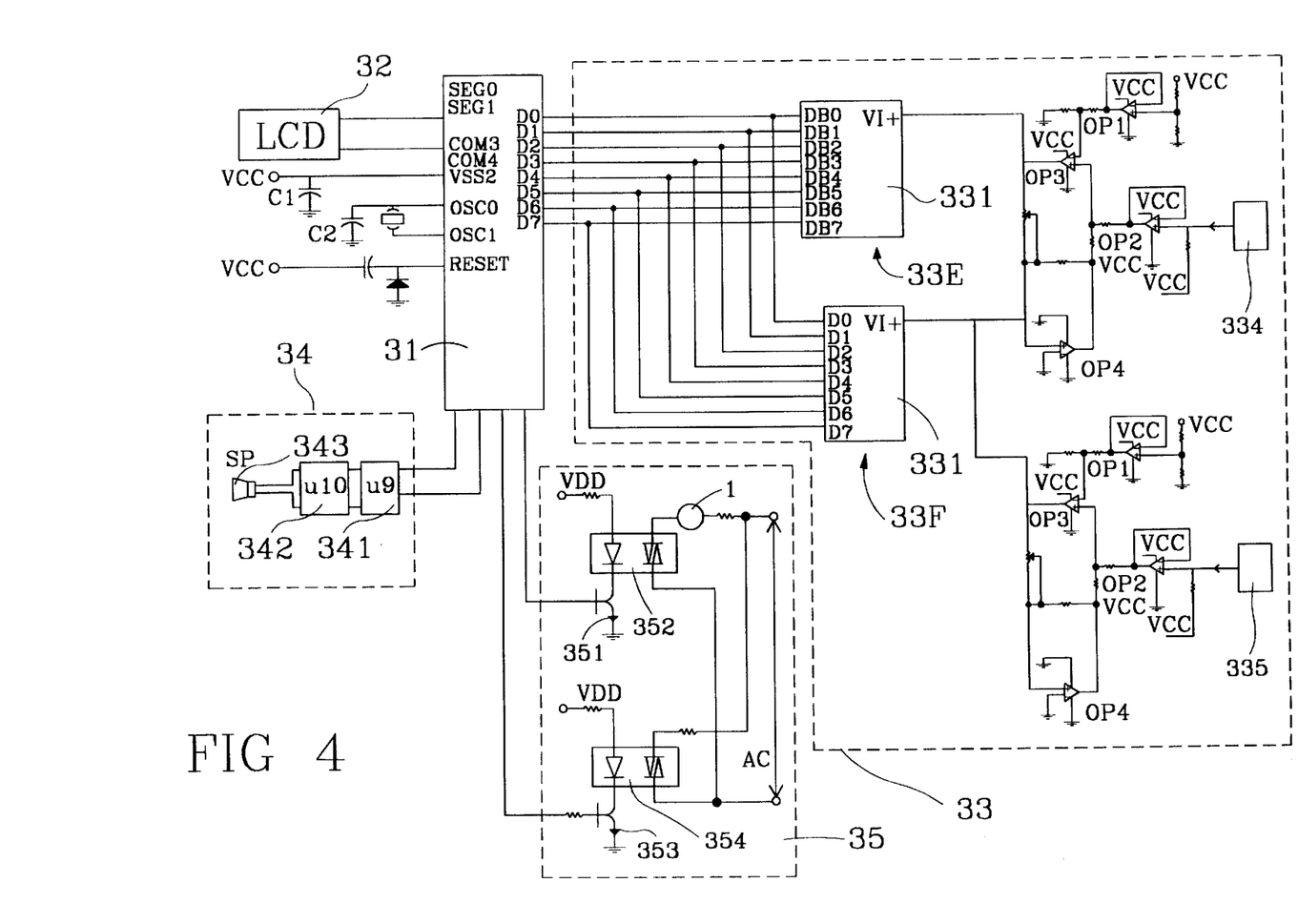
FIG. 4 is a circuit diagram of an alternative mode of the monitoring device for a reverse osmosis purification system of drinking water having at least a reverse osmosis filtration according to the present invention.
Figure 5:
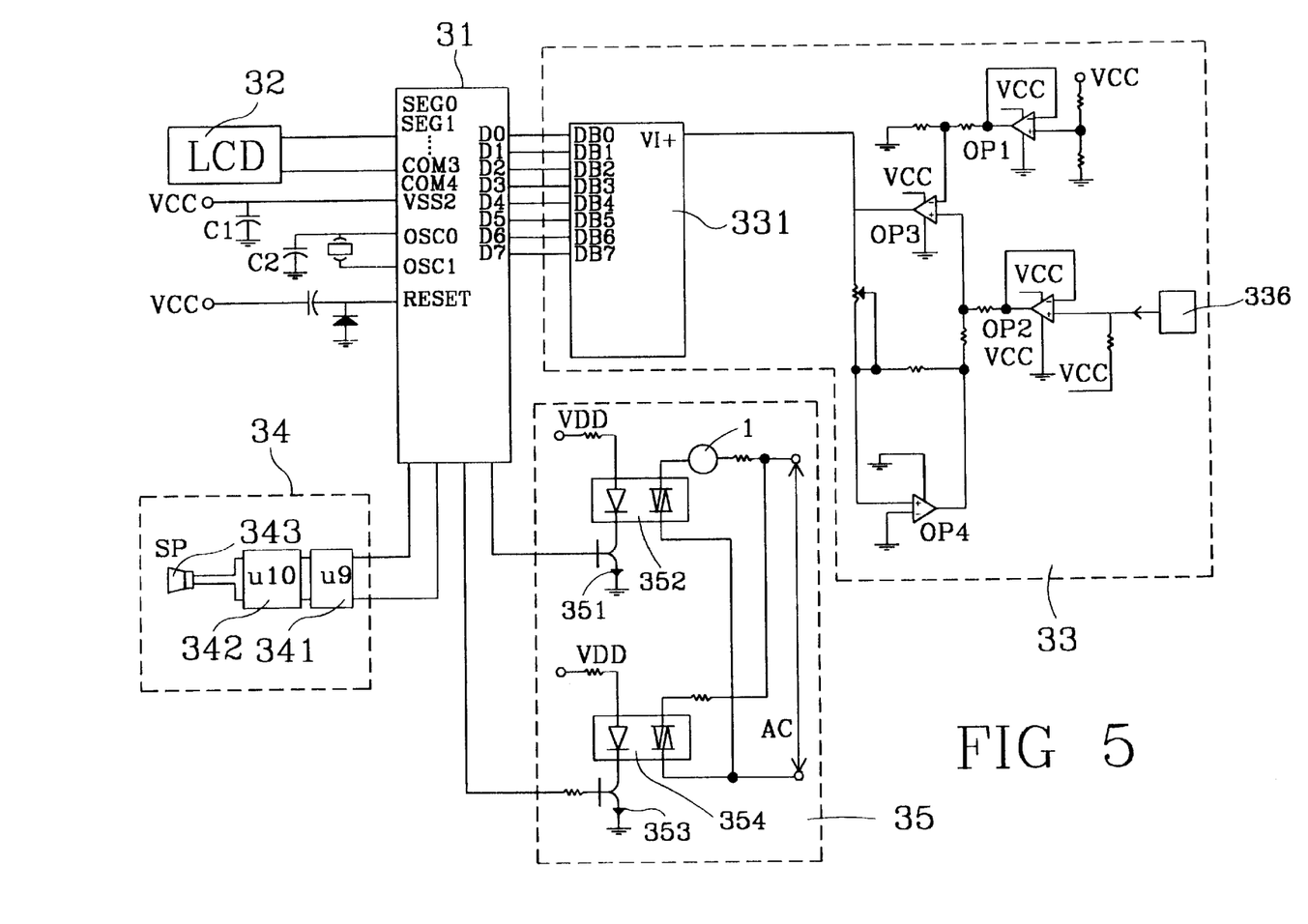
FIG. 5 is a circuit diagram of another alternative mode of the monitoring device for a reverse osmosis purification system of drinking water having at least a reverse osmosis filtration according to the present invention.

In accordance with the monitoring device for a reverse osmosis purification system of drinking water as disclosed above, as shown in FIGS. 3 to 5, the warning means 34 comprises a sound generating circuitry having a configuration that produces verbal or musical sound for warning consumers about the clogged condition of the water filtration elements. Of course the sound generating circuitry 34 can be replaced by a lighting generating circuitry instead. Moreover, the warning means 34 can comprise a sound generating circuitry and a lighting generating circuitry so as to generating both warning sound and warning lighting.

The warning means comprises a sound generating circuitry 34 which comprises an indicator circuit IC 341, a speaker driving circuit 342 and a speaker 343 electrically connected, in which the indicator circuit 341 stores a verbal or music sound track, and the speaker driving circuit 342 broadcasts the stored verbal sound or music of the indicator circuit IC 341 via the speaker 343.

Various water quality determining methods can be applied to monitor the functional integrity of the reverse osmosis filtration element. Such methods include monitoring of the water pressure difference between an outlet and an inlet of the reverse osmosis filtration element which may increase when the reverse osmosis filtration element C3 is ineffective. The varying PPM of the water discharged from the reverse osmosis filtration element C3 can indicate the drinking water quality and the filtering ability of the reverse osmosis filtration element C3. If the PPM of the water discharged from the reverse osmosis filtration element C3 exceeds 4 PPM, generally, the reverse osmosis membranes of the reverse osmosis filtration element are ineffective. Computing the total volume of the water filtered by the reverse osmosis filtration element C3 can also determine its filtering ability and service life. Detecting of a decrease of water flow out of the reverse osmosis filtration element C3 is an indication of the element being ineffective, because when the reverse osmosis filtration element C3 is clogged, the water flow out of the reverse osmosis filtration element C3 will decrease.

In accordance with the reverse osmosis filtration element C3, as shown in FIG. 3, the reverse osmosis detecting circuitry 33d comprises a plurality of operational amplifiers, OP1, OP2, OP3, and OP4, an analog to digital converter 331 and a PPM detecting sensor 333, such as TDS, electrically connected. The PPM detecting sensor 333 is installed in a water outlet of the reverse osmosis filtration element C3.

When the reverse osmosis filtration element C3 can not normally function and the PPM value detected by the PPM detecting sensor 333 is bigger than 4 PPM, the reverse osmosis filtration element C3 can be judged as ineffective and the drinking water so made is not safe for human consumption. Therefore, a PPM value detected signal detected by the PPM detecting sensor 333 is read by the operational amplifier OP2 which generates a PPM condition detecting value regarding the outlet water PPM. When such PPM condition detecting value rises to a predetermined PPM reference value preset in the operational amplifier OP1, which is the voltage value detected during 4 PPM, a clogged condition of the reverse osmosis filtration element C3 can be judged. In case the PPM condition detecting value generated by the operational amplifier OP2 is bigger than the predetermined PPM reference value of the operational amplifier OP1, a digital signal is sent from the analog to digital converter 331 to the microprocessor 31. The microprocessor 31 will then send an activating signal to activate the warning means 34 to advance the sound generating circuitry 34 to generate verbal or musical warning sound.

The power switching means 35 comprises a power cutoff circuitry 35a which comprises two transistors 351, 353 and two photoelectric driving power transistors 352, 354 electrically connected. The first transistor 351 is continuously activated to conduct electricity according to an activating signal sent from the microprocessor 31. The first photoelectric driving power transistor 352 activates the water pressure pump C1 (as shown in FIG. 1) to pump water flowing through the filtration elements to produce purified drinking water. Periodically, the microprocessor 31 is programmed to send another activating signal to activate the second transistor 353 to conduct electricity that causes the second photoelectric driving power transistor 354 to activate the water pressure pump C1 for automatically backwashing and cleaning the reverse osmosis membrane of the reverse osmosis filtration element C3. Therefore, the water quality is assured and the reverse osmosis membrane of the reverse osmosis filtration element C3 is protected from undesirable water pressure.

The microprocessor 31 is programmed to send a ceasing signal to activate the first transistor 351 when the warning means 34 generates the warning information sound signal for a certain predetermined period of time, in order to stop the water pressure pump C1 for cutting off the drinking water supply of the whole reverse osmosis purification system. At that moment the reverse osmosis filtration element will not produce drinking water any more until the user of the reverse osmosis purification system of drinking water replaces the worn-out filtration element and manually resets and restarts the system. Therefore, the water quality can be assured.

When the reverse osmosis membranes of the reverse osmosis filtration element C3 is clogged, the pressure difference between the inlet water pressure and the outlet water pressure of the reverse osmosis filtration element C3 varies.

Therefore, in detecting the inlet water pressure and the outlet water pressure of the reverse osmosis filtration element C3, one can judge whether the reverse osmosis filtration element C3 is clogged and ineffective. Referring to FIG. 4, an alternative mode of the detecting means 33 for the reverse osmosis filtration element is illustrated. The detecting means 33 comprises two identical reverse osmosis detecting circuitries 33e and 33d and two detectors 334, 335.

Each of the reverse osmosis detecting circuitries 33e and 33f comprises a plurality of operational amplifiers, OP1, OP2, OP3, and OP4, and an analog to digital converter. The two detectors are two water pressure detecting sensors 334, 335 electrically connected with the two first operational amplifiers OP2 of two reverse osmosis detecting circuitries 33e, 33f respectively. The water pressure sensor 334 is installed in the water inlet of the reverse osmosis filtration element C3 and connected to the operational amplifier OP2 of the reverse osmosis detecting circuitry 33e. The water pressure sensor 335 is installed in the water outlet of the reverse osmosis filtration element C3 and connected to the operational amplifier OP2 of the reverse osmosis detecting circuitry 33f. In this mode, the clogged condition of the reverse osmosis filtration element C3 can be detected by the differential pressure between the inlet and outlet water pressure.

Referring to FIG. 5, another alternative mode of the reverse osmosis filtration element C3 is illustrated. This alternative mode is different from the previous mode shown in FIG. 3 in that a flow detecting sensor 336 is installed in the water outlet of the reverse osmosis filtration element C3 and connected to the operational amplifier OP2, instead of the PPM detecting sensor 333. In this mode, the clogged condition of the reverse osmosis filtration element C3 is detected by the reduction in outlet flow amount instead of the variation in the PPM value of the drinking water made.

The monitoring process for a reverse osmosis purification system of drinking water is further described hereinafter.

The monitoring process of a reverse osmosis purification system of drinking water having at least a reverse osmosis filtration element and a water pressure pump for pumping pressurized water through the reverse osmosis filtration element comprises the steps of (1) inputting and formatting specific service life data of the reverse osmosis filtration element into a microprocessor as a predetermined reference value;

(2) monitoring a functional integrity of the reverse osmosis filtration element by detecting the quality of the drinking water so made by at least a detector and transmitting a detected signal to a reverse osmosis detecting circuitry which is electrically connected with the detector and the microprocessor;

(3) generating a condition detecting value regarding the functional condition of the reverse osmosis filtration element by the reverse osmosis detecting circuitry and comparing with the predetermined reference value regarding the service life of the reverse osmosis filtration element;

(4) sending a digital signal, which is readable by the microprocessor, to the microprocessor when the condition detecting value of the reverse osmosis filtration elements approximates the predetermined reference value, indicating that the service life of the reverse osmosis filtration element is completed;

(5) sending an activating signal to a warning means which is electrically connected with the microprocessor and advancing a warning information sound signal to notify of exact time of replacing the reverse osmosis filtration element by the warning means;

(6) cutting off the electric power to the water pressure pump to cease the supply of drinking water from the reverse osmosis purification system by a power switching means which is electrically connected with the microprocessor and activated by the microprocessor when the warning means is activated to generate the warning information sound signal exceeding a predetermined period of time; and (7) manually stopping the warning information sound signal of the warning means and restarting the reverse osmosis purification system to produce drinking water again once the worn-out reverse osmosis filtration element is replaced by a new one.

In addition, before step (5), the monitoring process further comprises an automatic RO cleaning step of temporarily ceasing the supply of drinking water from the reverse osmosis filtration element by means of the power switching means which is activated by the microprocessor periodically, so as to backwash and clean the impurities clogged on the reverse osmosis filtration element of the reverse osmosis purification system.

In addition, in the monitoring step (2), the detector is a PPM detecting sensor and the monitoring of the reverse osmosis filtration element is operated by detecting a PPM condition value of the outlet water from the reverse osmosis filtration element and transmitting a detected signal to the reverse osmosis detecting circuitry.

In addition, in the monitoring step (2), the monitoring of the reverse osmosis filtration element is operated by two detectors which are two water pressure sensors installed in a water inlet and a water outlet of the reverse osmosis filtration element, respectively, for detecting a water pressure differential variation across the reverse osmosis filtration element.

In addition, in the monitoring step (2), the detector is a flow detecting sensor installed in a water outlet of the reverse osmosis filtration element, and the monitoring of the reverse osmosis filtration element is operated by detecting the reduction in outlet water flow amount from the reverse osmosis filtration element and transmitting the detected signal to the reverse osmosis detecting circuitry.

In addition, after the formatting step (3), the monitoring process further comprises an indicating step of notifing of an exact timing of replacing the reverse osmosis filtration element of the reverse osmosis purification system and indicating related information received from the microprocessor, such as the data of current time, the time when the replacement of each filtration element has taken place, the PPM value of the drinking water made, the current value of water making volume, the total value of water making volume, the mechanical breakdown condition, etc., which are all stored in the microprocessor.

I claim:

1. A monitoring process for a reverse osmosis purification system for drinking water which comprises at least a reverse osmosis filtration element and a water pressure pump for pumping pressurized water through said reverse osmosis filtration element, comprising the steps of:

(a) inputting and formatting a specific service life datum of said reverse osmosis filtration element into a microprocessor as a predetermined reference value, wherein said specific service life datum is a water flow value at a water outlet of said reverse osmosis filtration element when said reverse osmosis filtration element is clogged with impurities and becomes ineffective;

(b) monitoring a functional condition of said reverse osmosis filtration element by at least a detector which is a water flow detecting sensor installed at said water outlet of said reverse osmosis filtration element, wherein said monitoring of said reverse osmosis filtration element is operated by detecting a reduction in an outlet water flow amount at said water outlet of said reverse osmosis filtration element and transmitting a detected signal to a reverse osmosis detecting circuitry which is connected with said detector and said microprocessor;

(c) generating a condition detecting value with respect to said functional condition that is said detected signal regarding said outlet water flow amount of said reverse osmosis filtration and element and comparing said condition detecting value with said predetermined reference value, regarding said service life of said reverse osmosis filtration element, by said reverse osmosis detecting circuitry;

(d) temporarily ceasing supply of drinking water from said reverse osmosis filtration element by a power switching means which is activated by said microprocessor periodically, so as to backwash and clean said reverse osmosis filtration element;

(e) sending a digital signal, which is readable by said microprocessor, to said microprocessor by said reverse osmosis detecting circuitry when said condition detecting value of said reverse osmosis filtration element is detected approximating to said predetermined reference value, indicating that said service life of said reverse osmosis filtration element is expired;

(f) sending an activation signal to a warning means which is electrically connected with said microprocessor and advancing a warning information sound signal by said warning means to remind a timing of replacing said reverse osmosis filtration element;

(g) cutting off electric power to said water pressure pump to cease drinking water supply of said reverse osmosis purification system by said power switching means which is electrically connected with said microprocessor and activated by said microprocessor when said warning means is activated to generate said warning information sound signal for a time period exceeding a predetermined period of time; and (h) manually stopping said warning information sound signal of said warning means and restarting said reverse osmosis purification system to produce drinking water again when said reverse osmosis filtration element is replaced by another new reverse osmosis filtration element.

* * * * *